United States Patent [19]
Schwarz et al.

[11] Patent Number: 5,200,886
[45] Date of Patent: Apr. 6, 1993

[54] START-UP FOR A SWITCHED-MODE POWER SUPPLY

[75] Inventors: Karl Schwarz, Krumbach/Attenhausen; Horst Bartussek, Augsburg; Helmut Rettenmaier, Grossaitingen, all of Fed. Rep. of Germany

[73] Assignee: Siemens Nixdorf Informationssysteme Aktiengesellschaft, Paderborn, Fed. Rep. of Germany

[21] Appl. No.: 838,452
[22] PCT Filed: Sep. 11, 1990
[86] PCT No.: PCT/DE90/00697
§ 371 Date: Mar. 10, 1992
§ 102(e) Date: Mar. 10, 1992
[87] PCT Pub. No.: WO91/04605
PCT Pub. Date: Apr. 4, 1991

[30] Foreign Application Priority Data
Sep. 12, 1989 [DE] Fed. Rep. of Germany ....... 3930432

[51] Int. Cl.$^5$ ............................................. H02M 7/517
[52] U.S. Cl. ......................................... 363/49; 363/21; 363/131
[58] Field of Search ....................... 363/20, 21, 24, 25, 363/26, 49, 97, 131, 134

[56] References Cited
U.S. PATENT DOCUMENTS

| | | | |
|---|---|---|---|
| 4,302,803 | 11/1981 | Shelly | 363/20 |
| 4,763,238 | 8/1988 | Maige | 363/21 |
| 4,964,028 | 10/1990 | Spataro | 363/21 |
| 5,083,254 | 1/1992 | Feldtkeller | 363/49 |
| 5,103,386 | 4/1992 | Herrmann | 363/21 |

FOREIGN PATENT DOCUMENTS
0301386 2/1989 European Pat. Off. .

OTHER PUBLICATIONS
"Low Loss-Type Starter Circuit for Switching Mode Power Supply"; IBM Technical Disclosure Bulletin; Oct., 1988; vol. 31, No. 5; Armonk, N.Y., pp. 424-425.

Primary Examiner—Steven L. Stephan
Assistant Examiner—Jeffrey Sterrett
Attorney, Agent, or Firm—Hill, Steadman & Simpson

[57] ABSTRACT

It is intended to improve especially a switched-mode power supply operating in accordance with the flyback converter principle, in such a manner that it has a characteristic during the run-up phase which is easier on the components compared with previously. To keep the regulating voltage of the regulating circuit (Rk) of the switched-mode power supply constant during the run-up phase, a differentiating capacitor (Cd) is connected in parallel with a diode circuit (D1) in one case and between the cathode terminals of two diode circuits (D1 and D2) in the other case. Keeping the regulating voltage constant results in a uniformly linear running-up of the switched-mode power supply output voltage (Ua), as a result of which lastly the loading on various components is also reduced.

2 Claims, 2 Drawing Sheets

REGULATING CIRCUIT

REGULATING CIRCUIT

START-UP FOR A SWITCHED-MODE POWER SUPPLY

BACKGROUND OF THE INVENTION

The invention relates to a switched-mode power supply.

A number of problems occur particularly in the case of flyback converter-type power supplies which do not have their own auxiliary power supply for supplying the regulating circuit arranged in the switched-mode power supply with the necessary supply and regulating voltage for the running-up phase after a switch-on, thus, for example, due to the fact that the output voltage does not rise linearly, that the running-up time of the output voltage cannot be calculated, in practice, and that the running-up curve of the output voltage depends on the complex load resistance.

Since the regulating circuit is only supplied with the full supply and regulating voltage from the auxiliary winding after the running-up phase, a capacitor is needed for the regulating circuit which supplies the voltages needed by the regulating circuit for operating and starting the regulating process in this phase. At the beginning of the running-up phase, this capacitor must be capable of accommodating such an amount of energy that during the running-up phase, the supply voltage at the regulating circuit does not drop below the value at which the regulating circuit stops operating because of undervoltage and breaks off the running-up. The problem of sufficiently high energy storage, however, cannot be easily solved by means of a correspondingly large capacitor since otherwise the running-up attempt in the case of a short circuit at the output of the switched mode power supply would take too long, as a result of which components would possibly be overloaded for too long a period.

Another problem associated with the size of this capacitor is the delay time after which the regulating circuit carries out its first regulating attempt when the alternating line voltage is applied. This is determined by the capacitance of the capacitor concerned and its associated series resistor. The larger the capacitor, the longer it takes until the regulating circuit begins to regulate for the first time.

Since the output voltage has not yet reached its final value in the running-up phase, the energy balance in the transformer is not yet correct in this phase. In the ideal case, the energy balance should look as follows:

$$Ui * te = u * Ua * ta$$

$$Ui * te = u * Ua * ta$$

$$ta = \frac{Ui * te}{u * Ua} \quad (1)$$

$$T = te + ta \quad (2)$$

$$T = te + ta \quad (2)$$

Where:
Ui - rectified switched-mode power supply input voltage
Ua - output voltage of the switched-mode power supply
u - transformation ratio of the number of turns (Nprim/Nsec)
te - turn-on time of the switching transistor
ta - turn-off time of the switching transistor
T - duration of period A switching transistor controlled by the regulating circuit therefore in each case switches to a transformer which is partially magnetized to different extents. The consequence of this is that the collector current of the switching transistor continues to rise and the transformer continues to be magnetized until the collector current is switched off when a maximum value is reached. It can happen that the collector current has already reached its maximum value shortly before the turn-on of the switching transistor and the regulating circuit immediately switches it off again. In the case of unfavorable circuit tolerances but mainly in the case of high switching frequencies and when bipolar switching transistors having relatively long storage times are used, considerable overloading can occur in the components since energy is still transported into the transformer during the storage times of the switching transistor.

If the complex load resistance at the output of the switched-mode power supply has such an effect that the output voltage does not rise fast enough, this may also lead to the transformer being magnetized up into saturation, as a result of which components can be destroyed.

The situation described above also affects an output diode in the secondary circuit of the switched-mode power supply. During the blocking phase of the switched-mode power supply, the output diode is switched to be conductive for as long as energy is stored in the transformer. The more energy is stored in the transformer, the greater the output diode current. During the running up phase, the output diode current has not yet dropped back to zero at the beginning of the conducting phase of the switched-mode power supply. This means that the output diode is suddenly switched from the forward direction to the reverse direction, which leads to additional heating of the component. This component, if it is not greatly overdimensioned, can rapidly heat up to such an extent that it is destroyed, especially in the case of switched-mode power supplies with high output voltages.

From documents EP,A,0 301 386, 01.02.1989 and IBM Technical Disclosure Bulletin, Vol. 31 No. 5, Oct. 5, 1988, pates 424-425, switched-mode power supplies known which deal with the running-up phase to such an extent that they contain measures by means of which the time for the running-up phase is shortened. However, this does not affect the variation of the running-up phase itself which should be as uniform as possible. The running-up phase is accelerated by deriving the supply voltage of the regulating circuit from the rectified line voltage via a serial timing section having as short a time constant as possible during the switching-on phase and only later from the sensing circuit. To avoid power loss, the serial timing section is disconnected after the running-up phase. The circuit complexity for these measures is correspondingly great.

SUMMARY OF THE INVENTION

It is the object of the invention to improve a switched-mode power supply of the type initially mentioned, by means of simple measures, to such an extent that the switched-mode power supply exhibits a defined running-up phase which is easier on the components.

According to the invention, this object is achieved by a switched-mode power supply having an auxiliary winding supplying a supply and regulating voltage for a regulating circuit. One connecting side of the winding is connected, on the one hand, via at least one forward-polarized diode circuit to a supply input and via a voltage divider circuit to a regulating input of the regulating circuit and, on the other hand, via at lest one forward-polarized diode circuit nd a subsequent parallel RC section having a low-resistance resistor component to a primary-side collective connection. A differentiating capacitor is provided, one terminal side of which is connected to cathode terminal of the diode circuit which is connected to the supply input of the regulating circuit and the other terminal side of which is connected to the cathode terminal of the diode circuit, the cathode terminal of which is connected to the parallel RC section. It is a simple measure to the extent that only one additional component is needed which can also be inserted subsequently into the circuit. Use of the differentiating capacitor has the result that the regulating circuit already receives the needed regulating voltage at the beginning of the running-up phase. The regulating circuit then controls the switched-mode power supply in such a manner that the voltage dropped across the voltage divider, which forms the basis for the regulating voltage and for the supply voltage of the regulating circuit, is kept constant. A consequence of this is that the output voltage of the switched-mode power supply rises uniformly linearly. There is no high loading of the various components since now the demagnetizing time ta necessary in each case is made available for the transformer. Due to the uniform rise, the duration of the running-up can also be determined in a better way. The capacitor supplying the supply and the regulating voltage for the regulating circuit during the running-up phase can be omitted or remain small since its job is taken over by the differentiating capacitor. It is advantageously retained for high-frequency bypassing.

An advantageous development of the invention is that the differentiating capacitor has polarized terminal sides, the positively polarized terminal side of which is connected to the cathode terminal of the diode circuit which is connected to the supply input of the regulating circuit. Because of the relative size of the differentiating capacitor, it is suitable to use polarized electrolytic capacitors for this purpose.

BRIEF DESCRIPTION OF THE DRAWINGS

The features of the present invention which are believed to be novel, are set forth with particularity in the appended claims. The invention, together with further objects and advantages, may best be understood by reference of the following description taken in conjunction with the accompanying drawings, in the several Figures in which like reference numerals identify like elements, and in which:

DESCRIPTION OF THE PREFERRED EMBODIMENT

Figure 1:
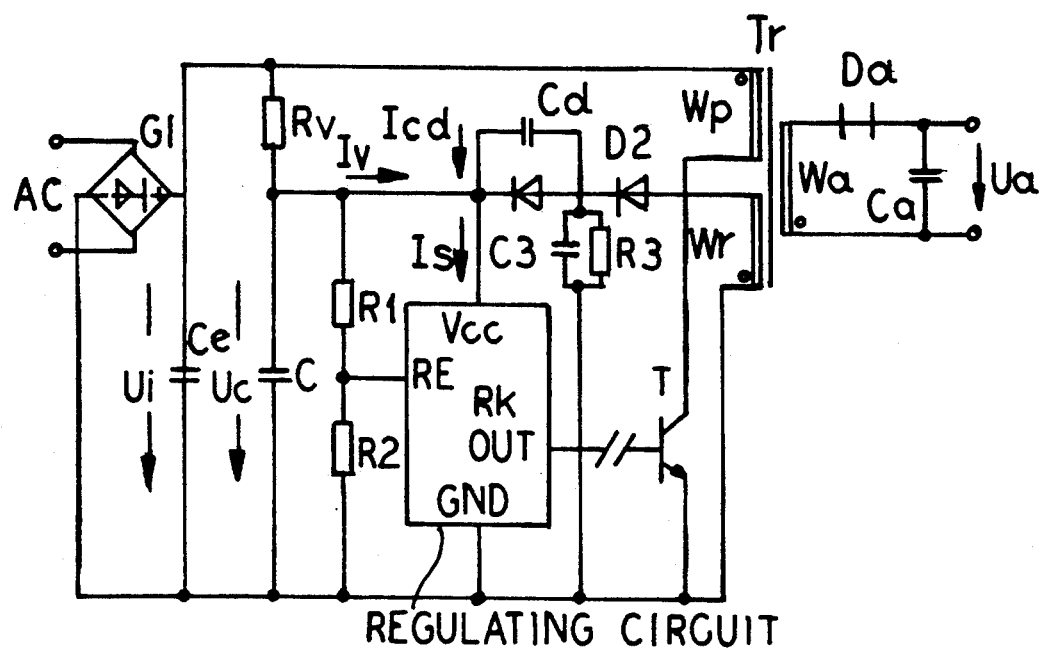
FIG. 1 shows a basic circuit diagram of a first switched-mode power supply according to the invention.
Figure 2:
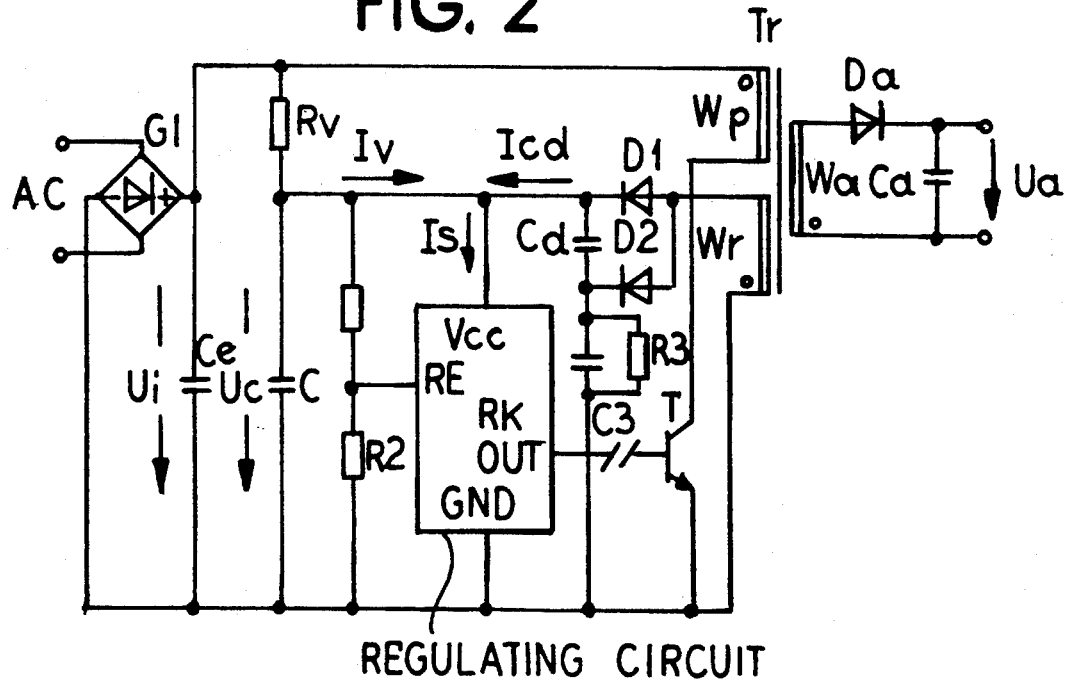
FIG. 2 shows a basic circuit diagram of a second switched-mode power supply according to the invention.

Both FIG. 1 and FIG. 2 show a basic circuit configuration of a switched-mode power supply operating in accordance with the flyback converter principle. The switched-mode power supplies given in FIGS. 1 and 2 differ from the prior art by having an additional differentiating capacitor Cd which is in each case associated with two diode circuits D1 and D2. Both switched-mode power supplies have a transformer Tr with three windings Wp, Wr and Wa. The first and second winding Wp, Wr are allocated to the primary circuit and the third winding Wa is allocated to the secondary circuit. The second winding Wr is an auxiliary winding and supplies the supply and regulating voltage for a regulating circuit Rk. The ends of the windings identified by a point form the respective winding inputs with the same winding sense in each case. The transformer Tr is an energy store which absorbs energy from the primary side during the conducting phases of the switched-mode power supply and delivers it again to the secondary side during the blocking phases of the switched-mode power supply.

On the primary side of the transformer Tr, an input rectifier circuit G1 and an input capacitor Ce are in each case provided. The input rectifier circuit G1 is supplied with the alternating input voltage AC. The input capacitor Ce is arranged between the polarized output terminals of the input rectifier circuit G1. It smooths the voltage rectified by the input rectifier circuit G1. At the same time, it acts as voltage buffer during amplitude fluctuations of the alternating input voltage AC.

The polarized outputs of the input rectifier circuit G1 are each connected to one of the winding inputs of the first two windings Wp and Wr, the positive output of the input rectifier circuit G1 being connected to the winding input of the first winding Wp. Furthermore, one series RC section consisting of a series resistor Rv and a capacitor C is in each case arranged between these outputs, the series resistor Rv being connected to the positive output of the input rectifier circuit G1. A voltage divider circuit consisting of the two single resistors R1 and R2, and a regulating circuit Rk are provided in parallel with the capacitor C. The input for the supply voltage Vcc of the regulating circuit Rk is connected to the series resistor Rv and the first resistor R1 of the voltage divider circuit and the regulating input RE of the regulating circuit Rk is connected to the center connection of the voltage divider circuit and the ground connection GND of the regulating circuit Rk is connected to the collective connection of the primary side which is formed by the negative output of the input rectifier circuit G1.

The regulating circuit Rk has an output OUT which is connected to the base terminal of a bipolar npn switching transistor T. This switching transistor is activated in dependence on a regulating voltage present at the regulating input RE of the regulating circuit Rk. Further components can be arranged between the output OUT of the regulating circuit Rk and the base terminal of the switching transistor T, which is indicated by two oblique parallel lines in the line section concerned. The collector terminal of the switching transistor T is connected to the winding output of the first winding Wp and its emitter terminal is connected to the collective connection defined above.

The winding output of the auxiliary winding Wr is connected to the supply input Vcc of the regulating circuit Rk via two forward-polarized diode circuits D1 and D2 in the switched-mode power supply according to FIG. 1 and only via one forward-polarized diode circuit D1 in the switched-mode power supply according to FIG. 2. In addition, a parallel RC section consisting of a low-resistance resistor R3 and a capacitor C3, the designation of which is matched to the resistor, is connected on the one hand to a connection between the diode circuits D1 and D2 and, on the other hand, to the collective connection of the primary circuit in the switched-mode power supply according to FIG. 1.

In the switched-mode power supply according to FIG. 2, the second diode circuit D2 is connected in parallel with the first diode circuit D1 with respect to the anode terminals. Furthermore, the parallel RC section is connected to the cathode terminal of the second diode circuit D2 instead of the connection between the two diode circuits.

On the secondary side of the transformer Tr, an output diode circuit Da and an output capacitor Ca is provided. The output diode circuit Da is connected with the anode terminal to the winding output of the third winding Wa of the transformer Tr. The output capacitor Ca is connected between the output terminals of the switched-mode power supply. The output diode circuit Da allows the output capacitor Ca to be charged.

In the text which follows, the operation of the two switched-mode power supplies according to FIG. 1 and FIG. 2, which is the same in principle, is explained in greater detail: When an alternating input voltage AC is applied to the input terminals of the input rectifier circuit G1, the alternating input voltage AC is rectified with the aid of the input rectifier circuit G1 and the rectified voltage is stored in the input capacitor Ce. Thus, the input voltage Ui is present across the input capacitor Ce. The input voltage Ui is also present across the series RC section formed by the series resistor Rv at the capacitor C. The capacitor C is charged up via the series resistor Rv until the regulating circuit Rk begins to operate. When the regulating circuit Rk begins to operate, the switching transistor T is periodically turned on with an initial pulse duty factor. In the turned-on state, the switched-mode power supply is in the so-called conducting phase and the transformer absorbs energy. Due to the opposite winding senses of the individual windings of the transformer Tr, no energy is delivered to the secondary circuit and to the regulating circuit in each case during the conducting phase. Energy is in each case transferred to these circuits during the blocking phase of the switching transistor T. This is when the output capacitor Ca and the capacitor C3 arranged in the parallel RC section are charged. The necessary energy must be supplied by the capacitor C until the capacitor C3 is charged to a value which allows the regulating circuit Rk to continue to operate. This means that the capacitor C is discharged again when the regulating circuit Rk begins to operate. This situation can be seen in the top curve in FIG. 3. This curve represents the qualitative voltage variation of the capacitor voltage Uc of the capacitor C during the running-up phase. When the capacitor C3 of the parallel RC section is sufficiently charged, the capacitor C is relieved and recharged again. This is shown by a kink in the voltage variation in the top curve.

Figure 3:
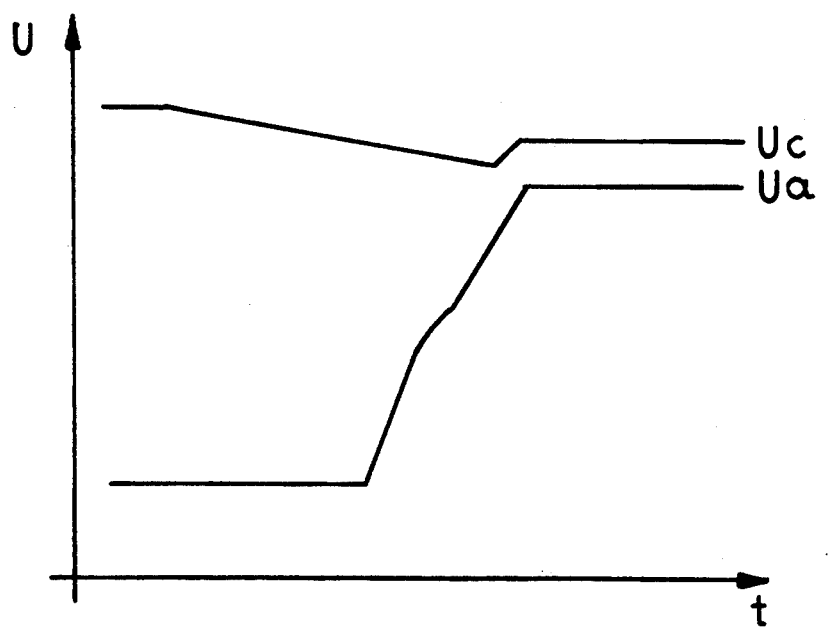
FIG. 3 shows a voltage diagram relating to the switched-mode power supply output voltage and the regulating voltage of a conventional switched-mode power supply during the running-up phase.

By comparison, the lower curve of FIG. 3 shows the qualitative voltage variation of the output voltage Ua across the output capacitor Ca. In parallel with the charging process of the capacitor C, this output voltage rises irregularly up to a final value in accordance with an approximately free regulating characteristic of the regulating circuit Rk. Shortly before, the capacitor C3 of the parallel RC section is charged up enough, which is why the voltage variation of the capacitor voltage Uc shows the kink before the maximum value of the output voltage Ua is reached.

Figure 4:
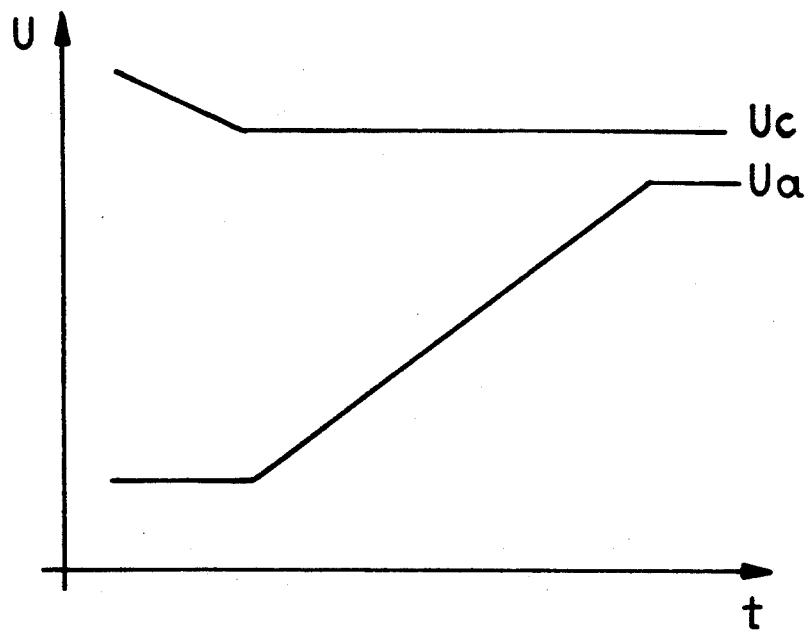
FIG. 4 shows a voltage diagram relating to the switched-mode power supply output voltage and the regulating voltage of a switched-mode power supply according to FIG. 1 or 2 during the running-up phase.

To improve the running-up characteristic of the output voltage Ua, a differentiating capacitor Cd is placed in parallel with the diode circuit D1 in the switched-mode power supply according to FIG. 1. Analogously to this, the differentiating capacitor Cd is arranged between the respective cathode terminals of the two diode circuits D1 and D2 in the switched-mode power supply according to FIG. 2. The differentiating capacitor Cd is charged, together with the capacitor C, via the series resistor Rv and the low-resistance resistor R3. During the blocking phases of the switching transistor T, the differentiating capacitor Cd is discharged, whereupon it supplies a differential current component Icd to the supply voltage and regulating voltage at the supply input Vcc and at the regulating input RE of the regulating circuit Rk. This means that the regulating circuit already receives the regulating information at the beginning of the running-up phase. The regulating information thus remains constant. The consequence of this is that the output voltage Ua is running-up with a uniformly linear increase. This situation is qualitatively reproduced in FIG. 4 by the top voltage curve which reproduces the capacitor voltage Uc and the lower voltage curve which gives the output voltage Ua.

Assuming ideal diode circuits D1 and D2, the situation can be explained as follows:

The following holds true during the running-up phase $0 < t < th$:

$$Uc = \text{constant} = k1 * th * \ddot{u}1 \qquad (4)$$

$$Uc = f1(th) = \ddot{u}1 * Ua(t) * th \qquad (5)$$

From (4) and (5), it follows that:

$$Uc = \text{constant} = kl * th * ul \qquad (4)$$
$$Uc = fl(th) = ul * U\alpha(t) * th \qquad (5)$$

$$fl(t) = k1 * t + k2$$

From the initial condition $k2 = 0$, it follows that:

$$fl(t) = k1 * t \qquad (6)$$

$$fl(t) = kl * t \qquad (6)$$

$$kl = \frac{Uc}{th} \qquad (7)$$

$$th = \frac{Uc * Cd}{Icd} \qquad (8)$$

$$Icd = Is - \frac{Ui - Uc}{Rv} + \frac{Uc}{R1 + R2} \qquad (9)$$

From (7), (8) and (9), it follows that:

$$kl = \frac{1}{Cd} * \left( Is - \frac{Ui - Uc}{Rv} + \frac{Uc}{R1 + R2} \right) \quad (10)$$

The following holds true:

$$Ua(t) = \frac{1}{ul} * kl * t \quad 0 \leq t \leq th \quad (11)$$

$$Ua(t) = \frac{1}{ul} * Uc \quad t > th$$

In the above equations:
  th—running-up time
  Uc—supply and regulating voltage
  kl—constant (slope of the output voltage Ua)
  fl(t)—voltage variation across resistor R3
  Ua(t)—voltage variation of the output voltage Ua of the switched-mode power supply
  ul—transformation ratio of the number of turns Wr/Wa
  Cd—capacitance of the differentiating capacitor Cd
  Icd—current through the differentiating capacitor Cd
  Is—input current at the supply input Vcc
  Iv—residual current of the current flowing through Rv, where $$Iv = \frac{Ui - Uc}{Rc} + \frac{Uc}{R1 + R2}$$

Ui—rectified switched-mode power supply input voltage
  Rv—series resistor
  R1, R2—voltage dividers Since the differentiating capacitor Cd handles the task of the capacitor C, the capacitor C can be omitted or become small for bypassing high-frequency voltage components. Since the supply voltage at the supply voltage input Vcc of the regulating circuit Rk is constant, the differentiating capacitor Cd can be selected to be smaller by a factor of 5, according to experience, compared with the previously absolutely necessary capacitor C in FIG. 1 and FIG. 2. Operating reliability is increased. The switched-mode power supply runs up more quickly and switches off more quickly in the event of a short circuit at the switched-mode power supply output.

Compared with the switched-mode power supply according to FIG. 1, the switched-mode power supply according to FIG. 2 has the advantage that the polarity of the differentiating capacitor Cd is not reversed.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

We claim:

1. A switched-mode power supply comprising: a serial RC section as running-up circuit and an auxiliary winding supplying a supply and regulating voltage for a regulating circuit, one connecting side of the auxiliary winding connected via at least one first forward-polarized diode circuit to a supply input of the regulating circuit and via a voltage divider circuit to a regulating input of the regulating circuit and the one connecting side of the auxiliary winding connected via at least one second forward-polarized diode circuit and a subsequent parallel RC section having a low-resistance resistor component to a primary-side collective connection; and a differentiating capacitor, one terminal side of the differentiating capacitor connected to a cathode terminal of the at least one first diode circuit which is connected to the supply input of the regulating circuit and the other terminal side of the differentiating capacitor connected to a cathode terminal of the at least one second diode circuit, the cathode terminal of the at least one second diode circuit being connected to the parallel RC section.

2. The switched-mode power supply as claimed in claim 1, wherein the differentiating capacitor has polarized terminal sides, a positively polarized terminal side of which is connected to the cathode terminal of the at least one first diode circuit which is connected to the supply input of the regulating circuit.

* * * * *